United States Patent
Aronov et al.

(10) Patent No.: US 10,860,341 B2
(45) Date of Patent: Dec. 8, 2020

(54) COORDINATING OPERATION OF A NUMBER OF DIFFERENT MODULES

(71) Applicant: ENTIT SOFTWARE LLC, Sanford, NC (US)

(72) Inventors: Svetlana Aronov, Yehud (IL); Asaf Alster, Yehud (IL); Moshe Eran Kraus, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 175 days.

(21) Appl. No.: 16/070,420

(22) PCT Filed: Jan. 25, 2016

(86) PCT No.: PCT/US2016/014711
§ 371 (c)(1),
(2) Date: Jul. 16, 2018

(87) PCT Pub. No.: WO2017/131609
PCT Pub. Date: Aug. 3, 2017

(65) Prior Publication Data
US 2019/0004824 A1    Jan. 3, 2019

(51) Int. Cl.
*G06F 9/448*   (2018.01)
*G06F 9/44*    (2018.01)
*G06F 11/30*   (2006.01)
*G06F 9/48*    (2006.01)

(52) U.S. Cl.
CPC .............. *G06F 9/4498* (2018.02); *G06F 9/44* (2013.01); *G06F 9/4843* (2013.01); *G06F 11/30* (2013.01)

(58) Field of Classification Search
CPC ........ G06F 9/4498; G06F 9/44; G06F 9/4843; G06F 11/30
See application file for complete search history.

(56) References Cited

U.S. PATENT DOCUMENTS

| | | |
|---|---|---|
| 6,421,700 B1 | 7/2002 | Holmes |
| 6,725,452 B1 | 4/2004 | Te'eni et al. |
| 6,766,311 B1 | 7/2004 | Wall et al. |
| 7,490,317 B1 * | 2/2009 | Hahn ...................... G06F 8/433 717/121 |
| 7,526,634 B1 | 4/2009 | Duluk, Jr. |

(Continued)

OTHER PUBLICATIONS

Clark, T., et al., bCMS in Leap, Aug. 2, 2012, Middlesex University, 21 pages.

(Continued)

*Primary Examiner* — Jacob D Dascomb (57) ABSTRACT

A method of coordinating operation of a number of different modules in a computing system that includes: receiving, at a state machine of a module, publication of an occurrence of a number of triggering states at modules of the computing system to which a current state of the state machine is subscribed; in response to receiving publication of the occurrence the number of triggering states at modules of the computing system to which a current state of the state machine is subscribed, sending a request to a central supervisor for authorization to advance to a next state; and in response to receiving authorization from the central supervisor, advancing the state machine to the next state corresponding to the number of triggering states that have occurred.

17 Claims, 7 Drawing Sheets

(56) References Cited

U.S. PATENT DOCUMENTS

| | | | |
|---|---|---|---|
| 9,378,458 B2* | 6/2016 | Miller | G06N 5/02 |
| 2006/0184947 A1 | 8/2006 | Endo | |
| 2009/0328069 A1* | 12/2009 | Lala | G06F 9/542 |
| | | | 719/318 |
| 2012/0209968 A1* | 8/2012 | Lawson | G06F 9/5072 |
| | | | 709/220 |
| 2014/0096110 A1 | 4/2014 | Charters et al. | |
| 2014/0181826 A1 | 6/2014 | Wolf | |

OTHER PUBLICATIONS

Lingkun Chu, et al., "Dependency Isolation for Thread-based Multi-tier Internet Services," 2005, 12 pages total.

International Searching Authority, International Search Report and Written Opinion dated Oct. 31, 2016 for PCT Application No. PCT/US2016/014711, filed Jan. 25, 2016, 14 pages.

Atalla F. Sayda, et al., "An Intelligent Multi Agent System for Integrated Control & Asset Management of Petroleum Production Facilities," Jun. 2007, 8 pages total.

* cited by examiner

COORDINATING OPERATION OF A NUMBER OF DIFFERENT MODULES

BACKGROUND

In some systems, functionality is divided among a number of different modules, with each module performing one or more particular tasks that are all part of the overall purpose of the system. Each module may include some combination of software and/or hardware that operates to perform particular functions. To achieve the overall purpose of the system, the operation of the various modules is coordinated. For example, the operation of one module may sometimes be dependent on another module having already completed a related task. As the complexity of any such system increases, it becomes more and more difficult to coordinate the operation of all the modules.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

As indicated above, the functionality of some systems is divided among a number of different modules, with each module performing one or more particular tasks that are all part of the overall purpose of the system. Each module may include some combination of software and/or hardware that operates to perform particular functions.

To achieve the overall purpose of the system, the operation of the various modules is coordinated. For example, the operation of one module may sometimes be dependent on another module having already completed a related task. If the other module has not completed the related task, the current module may be unable to complete or to correctly complete its task if it proceeds.

As used herein and in the following claims, the term "publish/subscribe" refers to a system or technique in which an entity can subscribe to receive notice when particular conditions are satisfied, and the system will then publish notice to that entity when the conditions of the subscription are fulfilled. As an example of this concept, a reader might subscribe to a blog, wanting to follow that blog. The conditions of the subscription are met when a new installment of the blog becomes available. The subscribed reader is then notified of, or may simply receive in some form, the latest installment of the biog. The concept of publish/subscribe can, however, be extended to any system in which a subscription is made specifying certain conditions that, when met, result in publication of notice, in some form, to the subscribing entity that the conditions of the subscription have been fulfilled.

As used herein and in the following claims, the term "state machine" refers to a logical construct within a computer system that can be in only one of a finite number of different states and can transition between the states in response to inputs.

As used herein and in the following claims, the term "progressive state" refers to a state in which a state machine is in the process of transitioning from one state to another. As used herein and in the following claims, the term "simple state" refers to any one of the finite number of states in which a state machine might be without being in the process of transitioning to another state. A simple state may represent the end result of a progressive state.

As used herein and in the following claims, the term "module" refers to a logical component of a computer system that preforms a designated function. A module may include hardware or software executed by hardware as needed to perform the designated function.

To coordinate the operation of a relatively large number of different modules in a system, the present specification describes the use of a state machine implemented at each module that tracks and characterizes the operation of the module over time. Each state of the state machine indicates where the respective module is in performing its functionality. In other words, the state of the state machine represents action completed by, or ongoing at, the underlying module.

Using the principle of publish/subscribe, one or more states of a state machine at each module may be subscribed to one or more related states of the state machine at the same or other modules. In this way, a state machine in a particular state will be notified when other related states occur at modules throughout the system. When all of these prerequisite states occur, the state machine with the subscribing state is notified and triggered to advance to a new state.

A central supervisor can receive a request by a state machine for authorization to advance to the next state when that state machine has received publication of notice that the states to which its current state is subscribed have occurred in the state machines throughout the system. The central supervisor confirms whether the requesting state machine can advance to the next state by determining whether the other modules, as represented by their state machines, are in states compatible with the requested advancement. The central supervisor then, accordingly, sends or withholds authorization to proceed.

As indicated, the states of each state machine correspond to the operation of the module on which the state machine resides. Thus, when a state machine is authorized to advance to a next state, this means that the antecedent operations of other modules needed for the current module to continue with its operation have occurred. Thus, as the state machine advances to its next state, the corresponding module can perform a next step or steps of its operation. In this way, the operation of all the modules is coordinated so that a module does not continue operation when some antecedent operation by another module has not occurred.

In one example, the present specification describes a method of coordinating operation of a number of different modules in a computing system that includes: receiving, at a state machine of a module, publication of an occurrence of a number of triggering states at modules of the computing system to which a current state of the state machine is subscribed; in response to receiving publication of the occurrence the number of triggering states at modules of the computing system to which a current state of the state machine is subscribed, sending a request to a central supervisor for authorization to advance to a next state; and in response to receiving authorization from the central supervisor, advancing the state machine to the next state corresponding to the number of triggering states that have occurred.

In another example, the present specification describes a computing system having a number of different modules. This example system includes: a client machine comprising at least one processor and associated memory; and a network interface for connecting the client machine to a remote server. The client machine further has a plurality of modules implemented with the processor and associated memory and for which operation is coordinated such that current states of the plurality of modules combine to define a current system state of the client machine. A state machine operates for each module, where different states of the state machines of the modules are each subscribed, in a publish/subscribe system, to at least one other specific state among the state machines of the modules.

In another example, a computer program product includes computer-executable instructions on a non-transitory, computer memory, the instructions, when executed by a processor, causing the processor to: implement a plurality of different cooperating modules, each module comprising a state machine that is in one of a number of states at a time, subscribe each of a number of states among the state machines to a number of states of the state machines among the plurality of modules, and publish a change from a first state to a second state of a first state machine among said modules, the change being published to a second state machine among said modules that has subscribed to the second state of the first state machine.

In the following description, for purposes of explanation, specific details are set forth in order to provide a thorough understanding of the disclosure. It will be apparent, however, to one skilled in the art that examples consistent with the present disclosure may be practiced without these specific details. Reference in the specification to "an implementation," "an example" or similar language means that a particular feature, structure, or characteristic described in connection with the implementation or example is included in at least that one implementation, but not necessarily in other implementations. The various instances of the phrase "in one implementation" or similar phrases in various places in the specification are not necessarily all referring to the same implementation.

Figure 1:
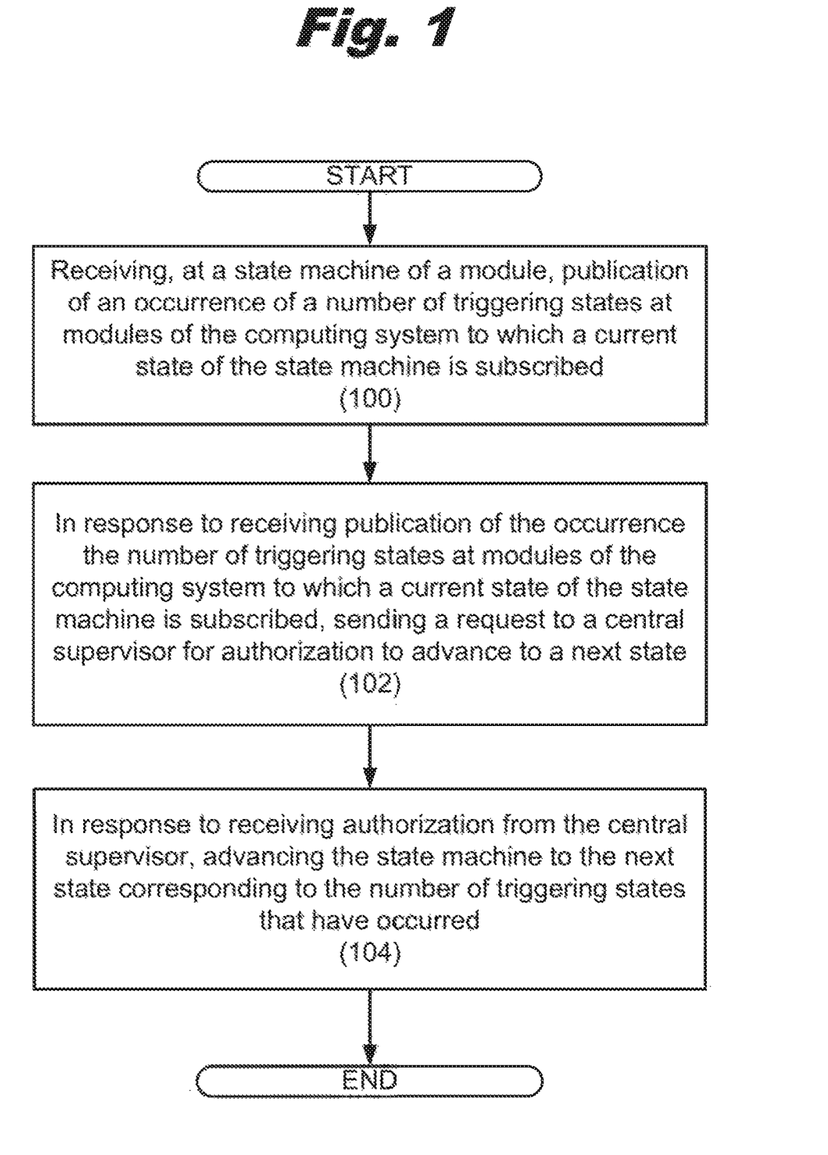
FIG. 1 is a flowchart showing an example method of coordinating operation of a number of different modules, consistent with the disclosed implementations.

FIG. 1 is a flowchart showing an example method of coordinating operation of a number of different modules, consistent with the disclosed implementations. As shown in FIG. 1, the example method includes receiving (100), at a state machine of a module, publication of an occurrence of a number of triggering states at modules of the computing system to which a current state of the state machine is subscribed. These triggering states are states that collectively represent that the various modules of the system have completed any antecedent tasks needed for the current module to proceed with its own operation. A state machine may be subscribed to the states of any other state machine and/or to one of its own states.

In response to receiving publication of the occurrence the number of triggering states at modules of the computing system to which a current state of the state machine is subscribed, the method includes sending (102) a request to a central supervisor for authorization to advance to a next state. Thus, having been notified through its state machine and the publish/subscribe system that all the various modules of the system have completed any antecedent tasks needed for the current module to proceed with its own operation, the current module seeks authorization to proceed from the central supervisor, which will be described in more detail below.

Lastly, in response to receiving authorization from the central supervisor, the method proceeds by advancing (104) the state machine to the next state corresponding to the number of triggering states that have occurred. Consequently, the current module will continue its operation until reaching a point represented by the new state of its corresponding state machine.

Figure 2:
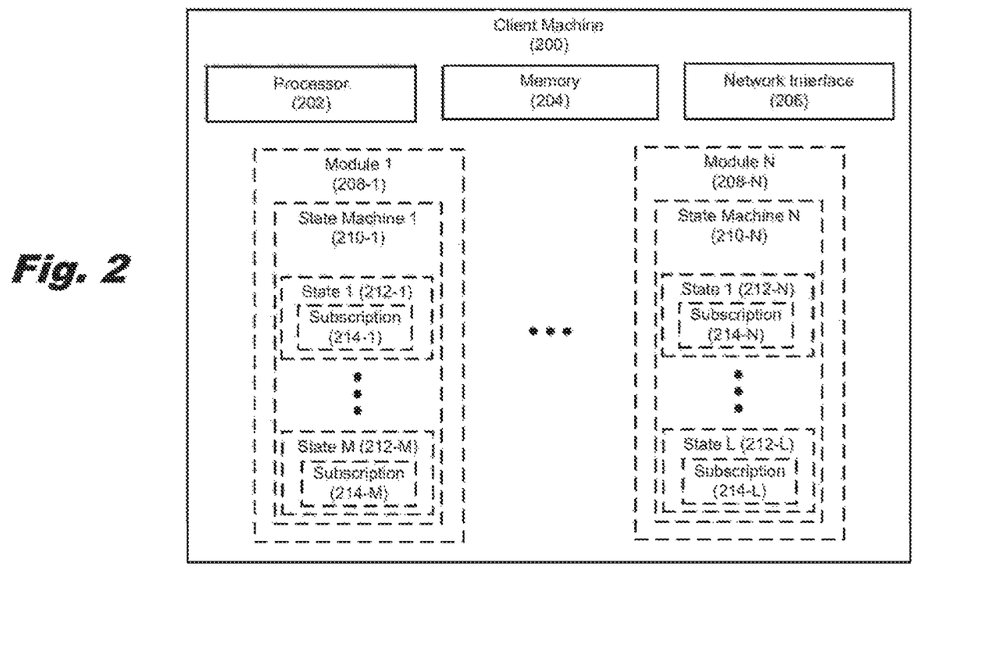
FIG. 2 is a diagram of an example client machine implementing a number of different coordinated modules, consistent with the disclosed implementations.

FIG. 2 is a diagram of an example client machine implementing a number of different, coordinated modules. As shown in FIG. 2, a client machine (200) includes at least one processor (202) and associated memory (204). The memory (204) stores programming for the processor and may also store data generated by or need by the processor while executing its programming.

The client machine (200) also incorporates a network interface (206) for connecting the client machine to a remote server. This interface (206) allows the client machine to communicate with, for example, a server or other machine that is needed for the client device (200) to perform its work. A specific example will be provided below.

The client machine (200) further has a plurality of modules (208-1-208-N) implemented with or by the processor and associated memory. As indicated, operation of the modules (208) is coordinated so that a module does not continue its own operation when any other module has not yet completed an antecedent task. The current states of the modules combine to define a current system state of the client machine.

A state machine (210-1-201-N) operates for each module (208). Each state machine (e.g. 210-1) has a number of states (212-1-212-M). The current state of a state machine (210) corresponds to, and indicates, where the corresponding module is in performing its operation.

Different states of each state machine of the modules can each be subscribed or have a subscription (214-1-214-M), in a publish/subscribe system, to at least one other specific state among the state machines of the modules. As indicated above, when the triggering states to which a state is subscribed occur, and the current state machine is so notified, the current state machine can consequently request authorization to advance its own state and allow its corresponding module to perform corresponding operations.

Figure 3:
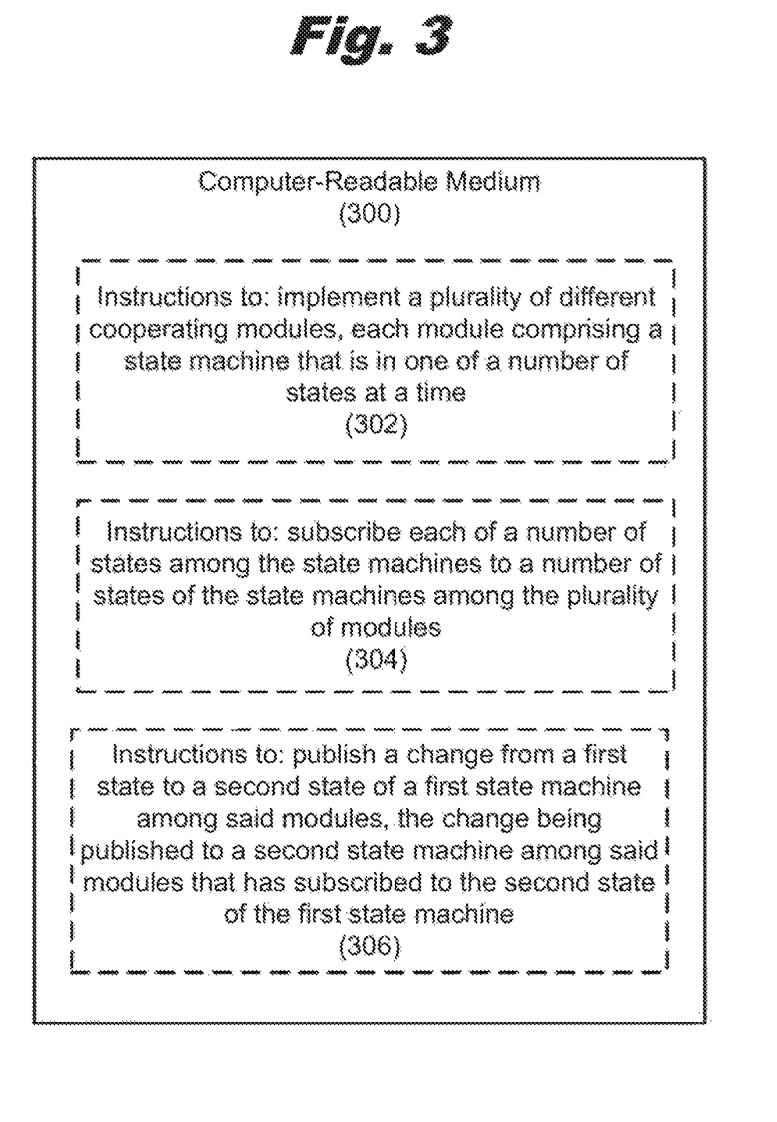
FIG. 3 is a diagram of an example computer-readable medium incorporating instructions for coordinating the operation of a number of different modules, consistent with the disclosed implementations.
Figure 4:
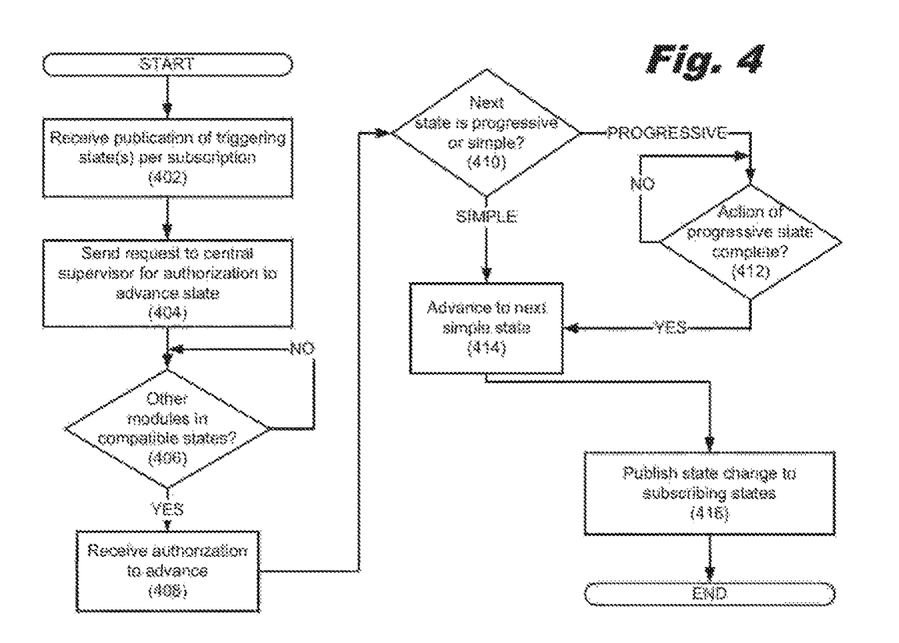
FIG. 4 is a flowchart showing another example method of coordinating the operation of a number of different modules, consistent with the disclosed implementations.

FIG. 3 is a diagram of an example computer-readable medium incorporating instructions for coordinating the operation of a number of different modules, consistent with the disclosed implementations. In the example of FIG. 3, a computer program product includes computer-executable instructions on a non-transitory, computer memory, the instructions, when executed by a processor, causing the processor to: implement (302) a plurality of different cooperating modules, each module comprising a state machine that is in one of a number of states at a time, subscribe (304) each of a number of states among the state machines to a number of states of the state machines among the plurality of modules, and publish (306) a change from a first state to a second state of a first state machine among said modules, the change being published to a second state machine among said modules that has subscribed to the second state of the first state machine. In various examples, the computer-readable medium (300) may be the memory unit (204) of FIG. 2 or may be a separate or different volatile or non-volatile memory device, including but not limited to, a hard-drive, Flash drive, Random Access Memory (RAM) and other types of memory devices FIG. 4 is a flowchart showing another example method of coordinating the operation of a number of different modules, consistent with the disclosed implementations. In the example of FIG. 4, the method begins with a module's state machine receiving publication (402) of one or more triggering states occurring among the state machines of the system. As described above, state machines receive such publication based on a subscription in which the current state of the state machine has subscribed to one or more triggering states among the state machines of the system and is consequently notified when those triggering states have occurred.

Upon receipt of publication that the triggering state or states have occurred, the state machine sends (404) a request to a central supervisor for authorization to advance to a next state. As will be described in further detail below, the central supervisor provides a check that all antecedent tasks needed by a module before that module's operation progresses have been completed. Thus, the central supervisor determines (406) whether the modules of the system are in a compatible state for the requesting state machine to advance and for the corresponding operation by the underlying module to occur.

If the central supervisor does not issue the authorization, the requesting state machine does not advance. Consequently, the underlying module does not continue operation without antecedent work by other modules being complete.

When authorization to advance is received (408) from the central supervisor, the state machine can advance to the next state. In some cases, the state machine may advance to a progressive state, which is state indicative of action being in progress, but not complete. When that action is complete, the state machine enters a corresponding simple state from the intervening progressive state. A progressive state will have a timeout associated with it. If the corresponding action is not completed within the designated time out, the state machine may return to a previous simple state preceding the progressive state.

Thus, when authorized to advance, the state machine may determine (410) whether the next state is a simple or progressive state. If the next state is a simple state, the state machine simply advances (414) to that next simple state. If, however, the next state is a progressive state, the state machine advances into that progressive state, and the corresponding module begins the action corresponding to that progressive state.

The state machine then waits for the action of the progressive state to be complete. When the action of the progressive state is completed (412), the state machine advances (414) to the next simple state that follows the progressive state. Because advancement to the progressive state was already authorized by the central supervisor, the state machine does not need additional authorization to advance from the progressive state to the corresponding simple state and does so automatically upon completion of the corresponding action by the underlying module.

Lastly, this new state achieved by the state machine may be a triggering state to which other states within the system are subscribed. Consequently, the state change achieved is published (416) to any subscribing states within the system. This may be the publication of a triggering state that restarts the process of FIG. 4 at block (402) in the same or a different state machine within the system.

Figure 5:
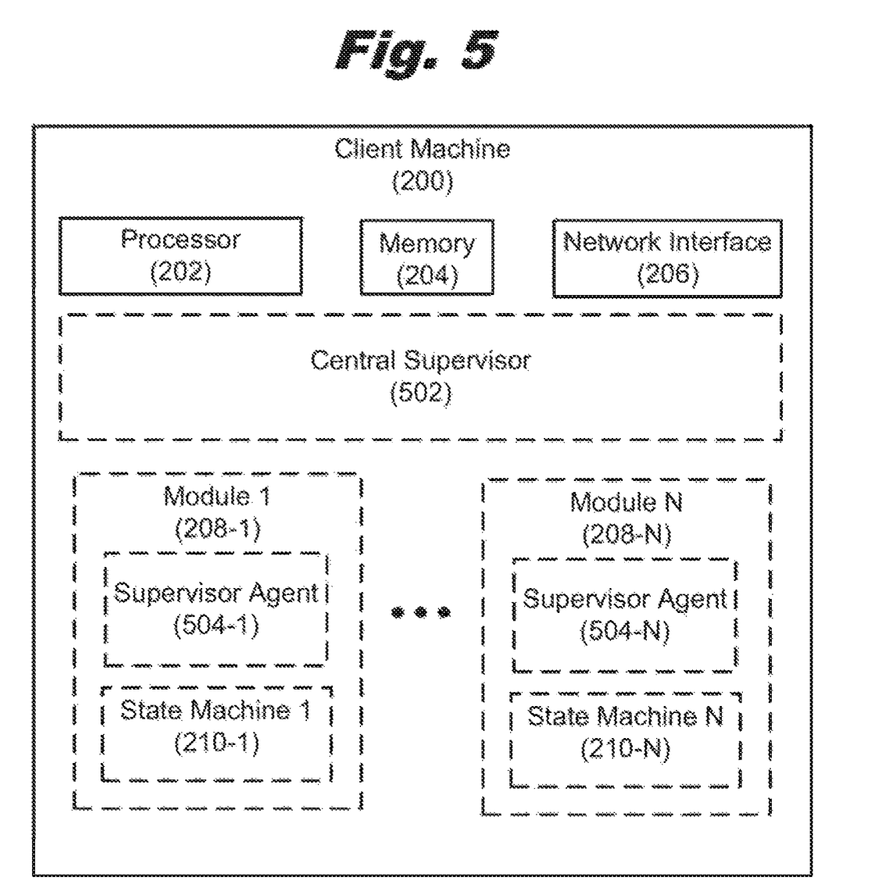
FIG. 5 is a diagram showing another example client machine implementing a number of different coordinated modules, consistent with the disclosed implementations.

FIG. 5 is a diagram showing another example client machine implementing a number of different coordinated modules, consistent with the disclosed implementations. As shown in FIG. 5, the client machine (200) includes a processor (202), memory (204) and network interface (206), as described above. Additionally, FIG. 5 illustrates a central supervisor (502), as described above, being part of the client machine (200). In other examples, the central supervisor (502) may be located on a different machine.

FIG. 5 further illustrates a number of modules (208-1-208-N) implemented by the client machine (200) as described above. Each module (208) includes a state machine (210) as also described above.

Each module (208) includes a supervisor agent (504-1-504-N). This supervisor agent (504) is an installation at the state machine (208) that interfaces with the central supervisor (502). The supervisor agent (504) is used to submit requests for authorization to advance state from the state machine (210) to the central supervisor (502). The supervisor agent (504) also keeps the central supervisor apprised of the current state of each state machine so that the supervisor agent (504) can verify that all state machines (210) and underlying modules (208) are in a compatible state before authorizing any state machine to advance to a new state.

In this example, the supervisor (502) operates in a generic manner. This means that the supervisor uses rules governing the coordination of modules that treat the modules by name or functionality without needing to refer to specific internal module logic.

Figure 6:
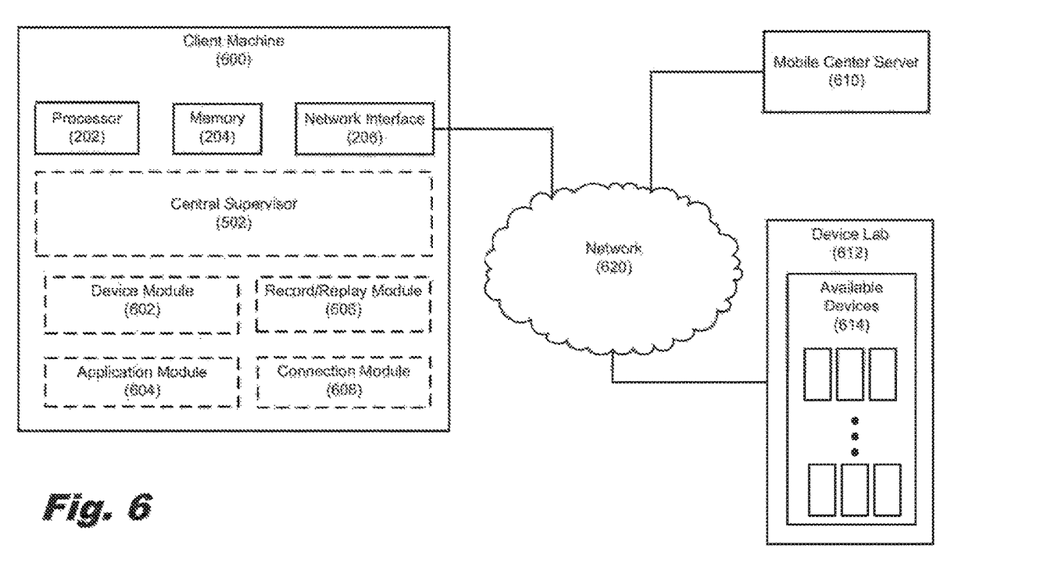
FIG. 6 is a diagram showing an example client machine operating in a system for testing mobile applications where the modules of the client machine are coordinated consistent with the disclosed implementations.

FIG. 6 is a diagram showing an example client machine operating in a system for testing mobile applications where the modules of the client machine are coordinated consistent with the disclosed implementations. As shown in FIG. 6, the client machine (600) includes a processor (202), memory (204) and network interface (206), as described above. Additionally, FIG. 6 illustrates a central supervisor (502), as described above, being part of the client machine (600).

This example client machine (600) is programmed to conduct testing of applications for installation to mobile devices, such as smartphones. A mobile application may be developed for use on a number of different device platforms. The system of FIG. 6 simplifies the process for an application developer to test an application on a variety of mobile devices.

Specifically, the client machine (600) communicates via a network (620) with a mobile center server (610). The mobile center server (610), in turn, communicates with a device lab (612). In the device lab (612), a collection of different mobile devices (614) are available. Thus, from the client machine (600), an application developer can have an application under development installed and tested on one or more of the mobile devices (614) at the device lab (612) and receive results of the test execution via the mobile center server (610) and network (620).

The client machine (600) includes four modules: a device module (602); an application module (604); a record/replay module (606) and a connection module (608). Each module will also be represented by a state machine, as described above, for indicating the action or state of that module.

In one example, the system of FIG. 6 might operate as follows. First, the connection module (608) will connect the client machine (600) to the Mobile Center Server (610). This may include authenticating the client machines (600) authorization to use the server (610). Next, the application module (604) will identify or select the application to be tested. This application may reside on the client machine (600) or may be located on some other device accessible to the client machine (600). The device module (602) designates the device or devices (614) at the device lab (612) on which the application is to be installed and tested. Lastly, the record/replay module (606) provides a test script that is input to the device (614) on which the application is executing and records for playback the corresponding output from the device (614).

These modules work in a coordinated fashion to conduct a test execution of an application. One example of the coordination needed is illustrated in FIG. 7.

Figure 7:
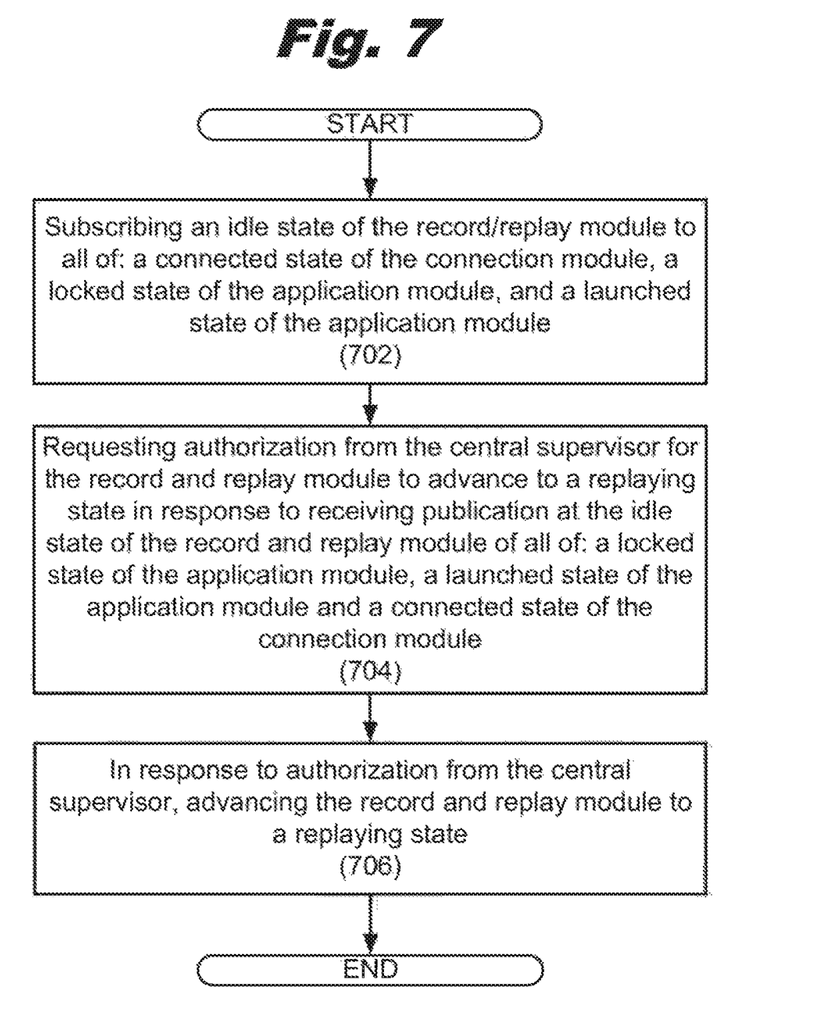
FIG. 7 is a flowchart showing an example method of coordinating operation of a number of different modules in a system for testing mobile applications, consistent with the disclosed implementations.

FIG. 7 is a flowchart showing an example method of coordinating operation of a number of different modules in a system for testing mobile applications, consistent with the disclosed implementations. When not operating, the record/replay module may be in an idle state. The record/replay module does not start its operation until certain actions have occurred with the other modules.

Thus, the idle state of the record/replay module is subscribed (702) to the following other states. The idle state of the record/replay module is subscribed to a connected state of the connection module, meaning that the connection module has opened a connection with the mobile center server. The idle state of the record/replay module is also subscribed to locked state of the application module, meaning that the application module is set to a particular application for testing. Lastly, the idle state of the record/replay module is also subscribed to a launched state of the application module, meaning that the application for testing has been installed and launched on the desired mobile device.

When each of these antecedent states has been achieved, the subscribed idle state of the record/replay module is notified using the publish/subscribe technique. The record/replay module then requests (704) authorization from the central supervisor to advance to the replaying state in which the test script for the application under test is played as input for the mobile device executing the application and the resulting output of the mobile device is recorded as the result of the test execution. Accordingly, in response to authorization from the central supervisor, the record/replay module advances (706) to the replaying state.

Returning to FIG. 6 for further explanation, it will be clear that the connection between the connection module (608) and the mobile center server (610) can be lost at any time for a variety of reasons. This will result in a new state for the connection module (608) that will be designated as the reconnecting state. Any states depending on the connection between the client device (600) and the server (610) may be subscribed to this state. Using publish/subscribe, when the connection module (608) enters a reconnecting state, this event is published to subscribing states at the state machines of other modules. Consequently, operation at those other modules can be suspended while the connection with the server (610), once lost, is reacquired.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of coordinating operation of modules in a computing system, the method comprising:
   receiving, at a first state machine of a first module of the computing system, publication of an occurrence of a triggering state to which a current state of the first state machine is subscribed, the triggering state being one of multiple states of a second state machine of a second module of the computing system;
   in response to receiving the publication of the occurrence of the triggering state to which the current state of the first state machine is subscribed, sending a request from the first module to a central supervisor for an authorization to advance to a next state of the first state machine;
   receiving, at the first state machine, the authorization from the central supervisor; and
   in response to receiving the authorization from the central supervisor, advancing the first state machine to the next state.

2. The method of claim 1, further comprising publishing completion of advancing the first state machine to the next state to any subscribing states of other state machines.

3. The method of claim 1, wherein the next state is a progressive state during which the first module is in transition to a simple state, the method further comprising, in response to completion of an action corresponding to a progressive state, automatically advancing the first module to a corresponding simple state.

4. The method of claim 1, wherein the modules in the computing system comprise:
   a device module for managing a selected mobile device from among a number of different mobile devices;
   an application module for managing an application under test;
   a record and replay module for installing and executing the application under test on the selected mobile device; and
   a connection module for managing a connection between the computing system and the selected mobile device.

5. The method of claim 4, further comprising subscribing an idle state of the record and replay module to all of: a locked state of the application module, a launched state of the application module and a connected state of the connection module.

6. The method of claim 5, further comprising requesting authorization from the central supervisor for the record and replay module to advance to a replaying state in response to receiving publication at the idle state of the record and replay module of all of: a locked state of the application module, a launched state of the application module and a connected state of the connection module.

7. The method of claim 6, further comprising, in response to authorization from the central supervisor, advancing the record and replay module to a replaying state.

8. A computing system comprising;
   a client machine comprising at least one processor and associated memory; and
   a network interface for connecting the client machine to a remote server;
   the client machine further comprising a plurality of modules implemented with the processor and associated memory and for which operation is coordinated such that current states of the plurality of modules combine to define a current system state of the client machine;
the client machine further comprising a plurality of state machines, wherein each state machine is associated with a different module of the plurality of modules, wherein a first state of a first state machine associated with a first module is subscribed, in a publish/subscribe system, to a second state of a second state machine associated with a second module, and wherein the first state machine is to:
receive publication of an occurrence of the second state of the second state machine associated with the second module;
in response to receiving the publication of the occurrence of the second state of the second state machine associated with the second module, send a request to a central supervisor for authorization to advance to a next state; and
in response to receiving authorization from the central supervisor indicating that the modules are in a compatible state for the first state machine to advance to the next state, advance the first state machine to the next state.

9. The computing system of claim 8, wherein the central supervisor has a supervisor agent at each of the modules.

10. The computing system of claim 8, wherein the plurality of modules in the computing system comprise:
a device module for managing a selected mobile device from among a number of different mobile devices;
an application module for managing an application under test;
a record and replay module for installing and executing the application under test on the selected mobile device; and
a connection module for managing a connection between the computing system and the selected mobile device.

11. The computing system of claim 10, further comprising a mobile center server for selectively operating any of the number of different mobile devices under direction from the record and replay module.

12. The computing system of claim 8, wherein the first state machine is to:
publish completion of advancing the first state machine to the next state to any subscribing states of other state machines.

13. A computer program product comprising computer-executable instructions on a non-transitory computer memory, the instructions, when executed by a processor, causing the processor to:
implement a plurality of modules in a computing device, each module comprising a state machine that is in one of a number of states at a time,
establish a subscription of a first state of a first state machine in a first module to a second state of a second state machine in a second module,
responsive to an occurrence of the second state in the second state machine, send a notification of the occurrence to the first state of the first state machine based on the subscription,
send a request from the first state machine to a central supervisor in response to receipt of the notification of the occurrence of the second state in the second state machine, the request seeking an authorization for the first state machine to transition to a next state, and
in response to receipt by the first state machine of the authorization from the central supervisor, advance the first state machine to the next state.

14. The computer program product of claim 13, wherein the plurality of modules comprises:
a device module for managing a selected mobile device from among a number of different mobile devices;
an application module for managing an application under test;
a record and replay module for installing and executing the application under test on the selected mobile device; and
a connection module for managing a connection between the computing device and the selected mobile device.

15. The computer program product of claim 13, the instructions, when executed, further causing the first state machine to:
publish completion of advancing the first state machine to the next state to any subscribing states of other state machines.

16. The computer program product of claim 15, wherein the next state is a progressive state during which the first module is in transition to a simple state.

17. The computer program product of claim 13, wherein the central supervisor uses a supervisor agent at each of the plurality of modules.

* * * * *